(12) United States Patent
Nakahira et al.

(10) Patent No.: US 12,294,878 B2
(45) Date of Patent: May 6, 2025

(54) WIRELESS COMMUNICATION SYSTEM, MONITORING STATION, DEFECT DETECTION METHOD, AND WIRELESS COMMUNICATION PROGRAM

(71) Applicant: Nippon Telegraph and Telephone Corporation, Tokyo (JP)

(72) Inventors: Toshiro Nakahira, Musashino (JP);
Hirantha Abeysekera, Musashino (JP);
Shoko Shinohara, Musashino (JP);
Koichi Ishihara, Musashino (JP);
Yasushi Takatori, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 367 days.

(21) Appl. No.: 17/796,142

(22) PCT Filed: Jan. 28, 2020

(86) PCT No.: PCT/JP2020/002979
§ 371 (c)(1),
(2) Date: Jul. 28, 2022

(87) PCT Pub. No.: WO2021/152693
PCT Pub. Date: Aug. 5, 2021

(65) Prior Publication Data
US 2023/0121752 A1 Apr. 20, 2023

(51) Int. Cl.
*H04W 56/00* (2009.01)
*H04L 43/0823* (2022.01)
*H04W 24/08* (2009.01)

(52) U.S. Cl.
CPC ......... *H04W 24/08* (2013.01); *H04L 43/0823* (2013.01)

(58) Field of Classification Search
CPC .......................... H04W 24/08; H04L 43/0823
(Continued)

(56) References Cited

U.S. PATENT DOCUMENTS

2005/0114743 A1* 5/2005 Moorhouse ............. H04L 41/06
714/100

FOREIGN PATENT DOCUMENTS

JP 2005527922 9/2005

OTHER PUBLICATIONS

"Park et al., Apparatus and Method for Monitoring Performance of Network Device in Wireless Communication System, Jul. 6, 2020, KR 20200079761" (Year: 2018).*

(Continued)

*Primary Examiner* — Sai Ming Chan
(74) *Attorney, Agent, or Firm* — Fish & Richardson P.C.

(57) ABSTRACT

In a wireless communication system including a plurality of base stations to which terminal stations are connectable, and a monitoring station which monitors each of the base stations, the monitoring station includes an information collection unit configured to collect wireless environment information including a plurality of information items indicating wireless environments around the base stations and the terminal stations, from each of the base stations, a defect detection unit configured to detect whether or not one or more defects occur based on a combination of the information items, and a defect determination unit configured to determine estimated occurrence probabilities of the defects detected by the defect detection unit based on a combination of the information items.

6 Claims, 9 Drawing Sheets

(58) Field of Classification Search
USPC .......................................................... 370/329
See application file for complete search history.

(56) References Cited

OTHER PUBLICATIONS

LAN/MAN Standards Committee of the IEEE Computer Society, "Part 11: Wireless LAN Medium Access Control (MAC) and Physical Layer (PHY) Specifications," IEEE Std 802.11™-2016, IEEE Standard for Information technology—Telecommunications and information exchange between systems Local and metropolitan area networks—Specific requirements, Dec. 14, 2016, 3534 pages.
NTT, "Easy office Wi-Fi service with support Giga Raku Wi-Fi," NTT East, retrieved on Nov. 7, 2019, retrieved from URL <https://business.ntt-east.co.jp/service/gigarakuwifi/>, 15 pages (with English Translation).

* cited by examiner

| INFORMATION ITEM | UNIT | DATA COLLECTION DATE AND TIME | | |
|---|---|---|---|---|
| | | 6/19 14:30 | 6/19 14:45 | 6/19 15:00 |
| THE SAME SSID, MAXIMUM RSSI VALUE OF PERIPHERAL APs | dBm | -43 | -45 | -43 |
| MAXIMUM RSSI VALUE OF PERIPHERAL APs OF OPERATING CHANNEL | dBm | -43 | -44 | -40 |
| THE NUMBER OF DETECTED PERIPHERAL APs OF OPERATING CHANNEL | - | 18 | 18 | 19 |
| TRANSMISSION DATA AMOUNT (DIFFERENCE FROM PREVIOUS ACQUISITION) | Kbyte | 13,259 | 235,981 | 513,213 |
| RECEPTION DATA AMOUNT (DIFFERENCE FROM PREVIOUS ACQUISITION) | Kbyte | 9,325 | 13,112 | 78,133 |
| THE NUMBER OF TERMINALS CURRENTLY BEING CONNECTED | - | 13 | 18 | 18 |
| CHANNEL UTILIZATION RATE OF OPERATING CHANNEL | % | 13 | 33 | 57 |
| MAXIMUM RSSI VALUE OF CONNECTED TERMINALS | dBm | -57 | -63 | -62 |
| MAXIMUM DATA RATE OF CONNECTED TERMINALS | Mbps | - | - | - |
| OPERATING STATE OF AP | 1: OPERATIONAL | 1 | 1 | 1 |
| THE NUMBER OF TIMES OF RADAR DETECTION | - | 1 | 0 | 0 |
| THE NUMBER OF TIMES OF CHANNEL TRANSITION | - | 1 | 0 | 0 |
| THE NUMBER OF TIMES OF CHANNEL CONNECTION | - | 5 | 8 | 2 |
| THE NUMBER OF TIMES OF CHANNEL DISCONNECTION | - | 0 | 3 | 2 |
| ⋮ | ⋮ | ⋮ | ⋮ | ⋮ |

Fig. 6

| INFORMATION ITEM | DETERMINATION CONDITION | DEFECT ITEM | | | | |
|---|---|---|---|---|---|---|
| | | HARDWARE FAILURE | RADIO WAVE INTERFERENCE | INSUFFICIENT STRENGTH | CONGESTION | ... |
| RSSI | EQUAL TO OR LESS THAN -70 dBm | 2 | 5 | 8 | 2 | ... |
| TRAFFIC | EQUAL TO OR LESS THAN 10 MB | 1 | 3 | 2 | 5 | ... |
| THE NUMBER OF CONNECTED TERMINALS | LESS THAN ONE | 5 | 1 | 1 | 1 | ... |
| ⋮ | ⋮ | ⋮ | ⋮ | ⋮ | ⋮ | ... |
| SCORE | | 20 | 80 | 5 | 10 | ... |

Fig. 7

| DEFECT ITEM | PROBABILITY |
| --- | --- |
| AP FAILURE/DEFECT | 0 to 1 |
| LAN CABLE FAILURE/DEFECT | 0 to 1 |
| LAN CABLE CONNECTION DEFECT | 0 to 1 |
| AC ADAPTER FAILURE/DEFECT | 0 to 1 |
| AC ADAPTER CONNECTION DEFECT | 0 to 1 |
| RADAR DETECTION | 0 to 1 |
| TERMINAL SETTING ERROR FAILURE/DEFECT | 0 to 1 |
| OTHER SYSTEM INTERFERENCE | 0 to 1 |
| OTHER AP INTERFERENCE | 0 to 1 |
| SIGNAL STRENGTH | 0 to 1 |
| UPPER LIMIT/BIAS OF THE NUMBER OF CONNECTED TERMINALS | 0 to 1 |
| CONGESTION DUE TO TOO MUCH TRAFFIC | 0 to 1 |

Fig. 9

WIRELESS COMMUNICATION SYSTEM, MONITORING STATION, DEFECT DETECTION METHOD, AND WIRELESS COMMUNICATION PROGRAM

CROSS-REFERENCE TO RELATED APPLICATIONS

This application is a National Stage application under 35 U.S.C. § 371 of International Application No. PCT/JP2020/002979, having an International Filing Date of Jan. 28, 2020, the disclosure of which is considered part of the disclosure of this application, and is incorporated by reference in its entirety into this application.

TECHNICAL FIELD

The present invention relates to a wireless communication system, a monitoring station, a defect detection method, and a wireless communication program.

BACKGROUND ART

Wireless communication systems using a radio wave in a 2.4 GHz band or a 5 GHz band include, for example, wireless communication systems based on IEEE802.11a standards, IEEE802.11g standards, or the like. Here, an orthogonal frequency division multiplexing (OFDM) modulation scheme can be used to stabilize characteristics in a multipath fading environment and achieve transmission speed of up to 54 Mbit/s.

Further, in a wireless communication system based on IEEE802.11n standards, transmission speed of up to 600 Mbit/s is achieved by using multiple input multiple output (MIMO) in which space division multiplexing is performed in the same wireless channel using plurality of antennas or using a channel bonding technique in which a frequency channel of 40 MHz is utilized by utilizing two frequency channels of 20 MHz at the same time, in a 2.4 GHz band or a 5 GHz band.

Further, in a wireless communication system based on IEEE802.11ac standards, wireless communication with higher speed and higher efficiency than wireless communication based on the IEEE802.11n standards is achieved by utilizing a channel bonding technique in which up to eight frequency channels of 20 MHz are utilized at the same time as a frequency channel of up to 160 MHz, a multi user MIMO technique in which different sin gal re s a transmitted a plurality of destinations using the same wireless channel at the same time, or the like, in a 5 GHz band (see, for example, Non-Patent Literature 1).

Further, in the above-described wireless communication system, or the like, there is a case where a monitoring station which monitors a service state is provided, and information is periodically collected from each base station to monitor whether or not a defect occurs in service. For example, there is a case where a support center performs unified management also in a case where there are a plurality of sites (see, for example, Non-Patent Literature 2).

CITATION LIST

Non-Patent Literature

Non-Patent Literature 1: IEEE Std 802.11-2016, December 2016.

Non-Patent Literature 2: Supported Easy Office Wi-Fi service GIGA RAKU Wi-Fi, [online], NIPPON TELEGRAPH AND TELEPHONE EAST CORPORATION, Accessed Nov. 7, 2019, Retrieved from: https://business.ntt-east.co.jp/service/gigarakuwifi/

SUMMARY OF THE INVENTION

Technical Problem

However, there has been a problem in related art that even if information is collected from each base station, whether or not a defect occurs in a wireless communication system cannot be efficiently detected.

An object of the present invention is to provide a wireless communication system, a monitoring station, a defect detection method, and a wireless communication program, with which it is possible to efficiently detect whether or not a defect occurs.

Means for Solving the Problem

A wireless communication system according to one aspect of the present invention is a wireless communication system including a plurality of base stations to which terminal stations are connectable, and a monitoring station which monitors each of the base stations, the monitoring station including an information collection unit configured to collect wireless environment information including a plurality of information items indicating wireless environments around the base stations and the terminal stations, from each of the base stations, a defect detection unit configured to detect whether or not one or more defects occur based on a combination of the information items, and a defect determination unit configured to determine estimated occurrence probabilities of the defects detected by the defect detection unit based on a combination of the information items.

Further, a monitoring station according to one aspect of the present invention is a monitoring station which monitors each of a plurality of base stations to which terminal stations are connectable, the monitoring station including an information collection unit configured to collect wireless environment information including a plurality of information items indicating wireless environments around the base stations and the terminal stations, from each of the base stations, a defect detection unit configured to detect whether or not one or more defects occur based on a combination of the information items, and a defect determination unit configured to determine estimated occurrence probabilities of the defects detected by the defect detection unit based on a combination of the information items.

Further, a defect detection method according to one aspect of the present invention is a defect on method for a wireless communication system including a plurality of base stations to which terminal stations are connectable, the defect detection method including an information collection step of collecting wireless environment information including a plurality of information items indicating wireless environments around the base stations and the terminal stations, from each of the base stations, a defect detection step of detecting whether or not one or more defects occur based on a combination of the information items, and a defect determination step of determining estimated occurrence probabilities of the detected defects based on a combination of the information items.

Effects of the Invention

According to the invention, possible to efficiently detect whether or not defect occurs.

DESCRIPTION OF EMBODIMENTS

Figure 1:
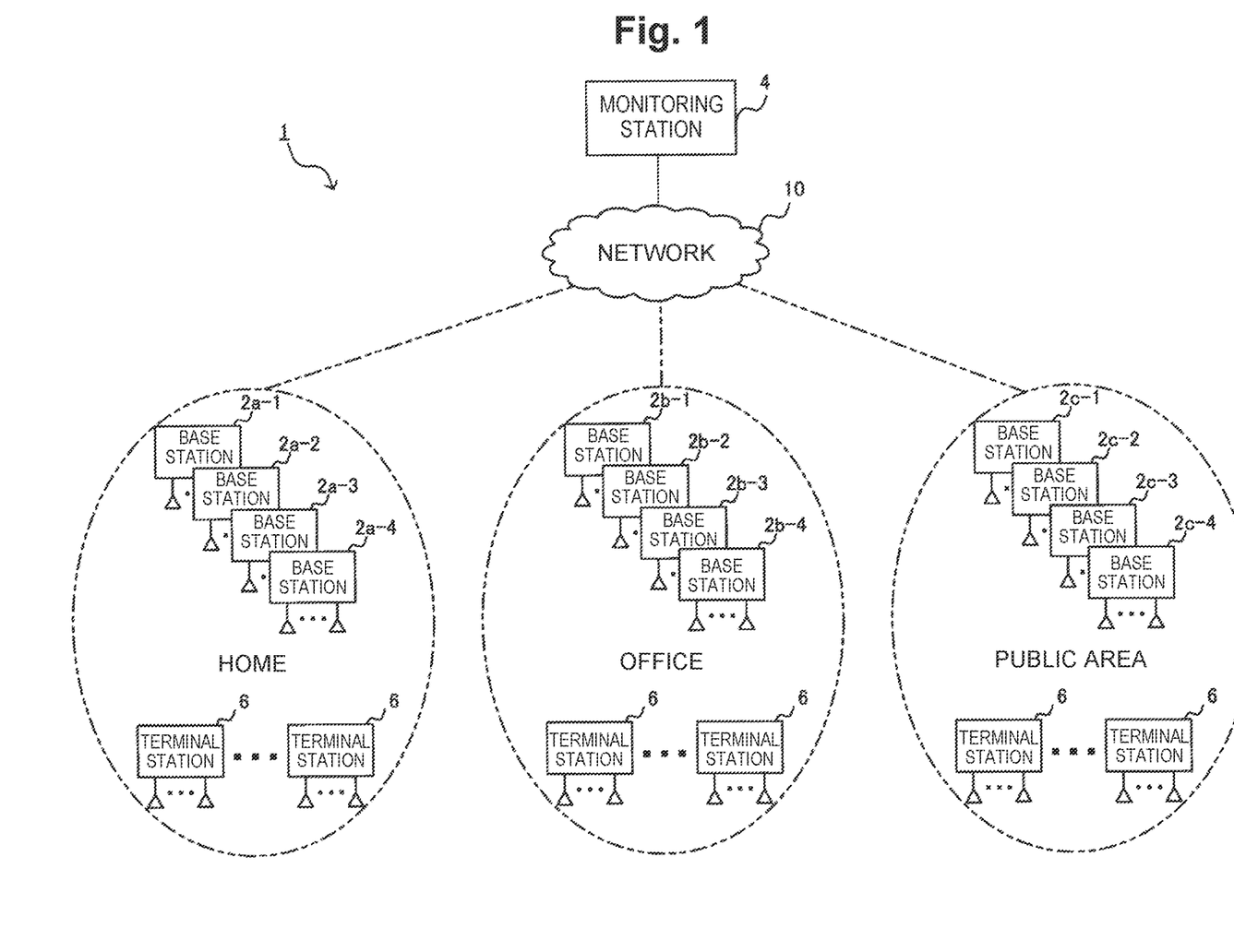
FIG. 1 illustrates a configuration example of a wireless communication system according to one embodiment.

One embodiment of a wireless communication system will be described below using the drawings. FIG. 1 illustrates a configuration example of a wireless communication system 1 according to one embodiment. As illustrated in FIG. 1, the wireless communication system 1 is constituted by, for example, base stations (APs) 2a-1 to 2a-4, 2b-1 to 2b-4 and 2c-1 to 2c-4 being respectively connected to a monitoring station 4 via a network 10.

The base stations 2a-1 to 2a-4 are respectively provided indoors of, for example, home, and a plurality of terminal stations 6 located around the base stations 2a-1 to 2a-4 are connectable to the base stations 2a-1 to 2a-4.

The base stations 2b-1 to 2b-4 are respectively provided indoors of, for example, office which is larger than home, and a plurality of terminal stations 6 located around the base stations 2b-1 to 2b-4 are connectable to the base stations 2b-1 to 2b-4.

The base stations 2c-1 to 2c-4 are respectively provided outdoors of, for example, a public area which is larger than office, and a plurality of terminal stations 6 located around the base stations 2c-1 to 2c-4 are connectable to the base stations 2c-1 to 2c-4.

Note that while an example of a case will be described where the wireless communication system. 1 operates in conformity with, for example, IEEE802.11ax standards, the wireless communication system 1 is not limited to this and may be a system which operates in conformity with other communication standards. Hereinafter, in a case where one of a plurality of components such as the base stations 2a-1 to 2a-4, 2b-1 to 2b-4 and 2c-1 to 2c-4 is not specified, the component will be simply abbreviated as the base station 2.

Figure 2:
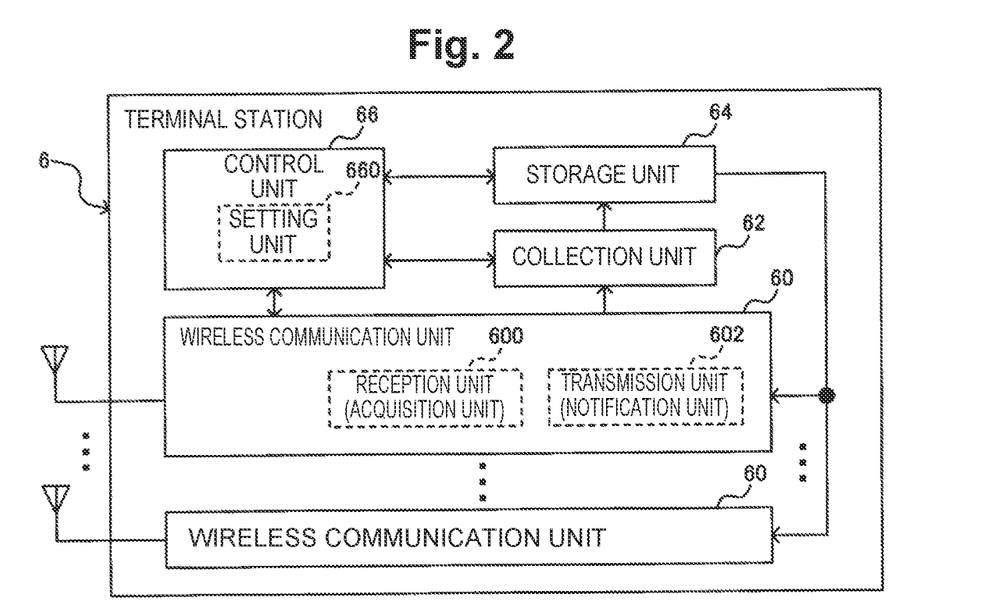
FIG. 2 is a functional block diagram illustrating an example of functions of a terminal station.

The terminal station 6 will be described first. FIG. 2 is a functional block diagram illustrating an example of functions of the terminal station 6. As illustrated in FIG. 2, the terminal station 6 includes, for example, a plurality of wireless communication units 60, a collection unit 62, a storage unit 64, and a control unit 66.

The wireless communication unit 60, which includes a reception unit (acquisition unit) 600 and a transmission unit (notification unit) 602, performs wireless communication with the base station 2 and other terminal stations 6.

The reception unit 600 acquires information by receiving signals transmitted by, for example, the base station 2 and other terminal stations 6 and outputs the information to the collection unit 62. The transmission unit. 602 transmits (notifies), for example, a signal indicating information stored in the storage unit 64 to the base station 2 and other terminal stations 6. Note that the wireless communication units 60 may use different frequency bands or may employ different communication schemes or may perform communication using the same communication scheme.

The collection unit 62 collects wireless environment information, or the like, indicating wireless environments around, for example, the base station 2 and other terminal stations 6 via the wireless communication unit 60 and outputs the wireless environment information, or the like, to the storage unit 64. The storage unit 64 stores the wireless environment information, or the like, collected by the collection unit 62.

The control unit 66, which includes a setting unit 660, controls respective units which constitute the terminal station 6. For example, the setting unit 660 performs setting for operation of the terminal station 6 based on information acquired by the wireless communication unit 60 from the base station 2.

Figure 3:
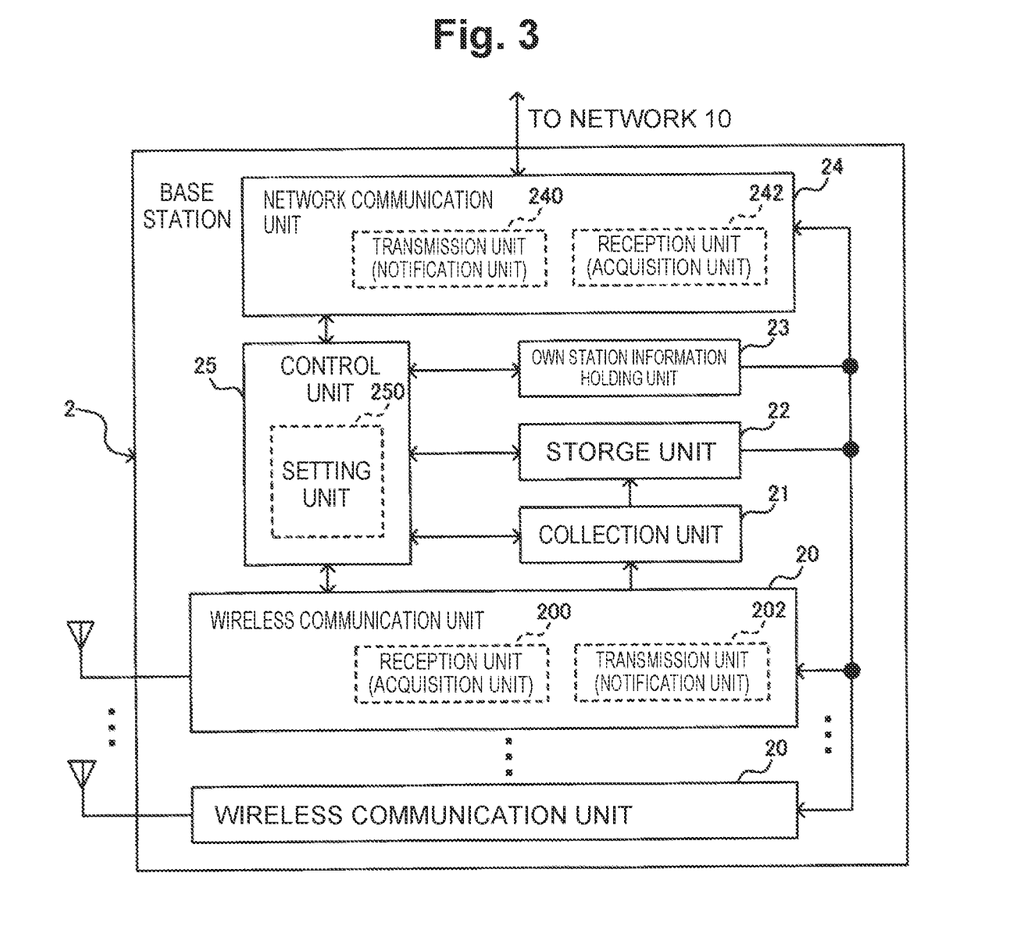
FIG. 3 is a functional block diagram illustrating an example of functions of a base station.

The base station. 2 will be described next. FIG. 3 is a functional block diagram illustrating an example of functions of the base station 2. As illustrated in FIG. 3, the base station 2 includes, for example, a plurality of wireless communication units 20, a collection unit 21, a storage unit 22, an own station information holding unit 23, a network communication unit 24, and a control unit 25.

The wireless communication unit 20, which includes a reception unit (acquisition unit) 200 and a transmission unit (notification unit) 202, performs wireless communication with other base stations 2 and the terminal station 6.

The reception unit 200 acquires information by receiving signals transmitted by, for example, other base stations 2 and the terminal station 6 and outputs the information to the collection unit 21. The transmission unit. 202 transmits (notifies), for example, information stored in the storage unit 64, own station information (which will be described later) held by the own station information holding unit 23, information acquired by the network communication unit 24 from the monitoring station 4, or the like, to other base stations 2 and the terminal station 6. Note that the wireless communication units 20 may use different frequency bands or may employ different communication schemes or may perform communication using the same communication scheme.

The collection unit 21 collects wireless environment information, or the like, including a plurality of information items (see FIG. 5) indicating wireless environments around, for example, other base stations 2 and the terminal station 6 from other base stations 2 and the terminal station 6 via the wireless communication unit 20 and outputs the wireless environment information, or the like, to the storage unit 22. Note that the wireless environment information may include information regarding communication between the base station 2 and the terminal station 6 and information regarding an operation state of the base station 2. The storage unit 22 stores the wireless environment information, or the like, collected by the collection unit 21.

The own station information holding unit 23 holds information regarding the base station 2. For example, the own station information holding unit 23 holds own station information including specifications, functions, or the like, of the own station, such as a frequency band and a communication scheme to be used by the base station 2, the number of connectable terminal stations and the number of wireless communication units 20.

The network communication unit 24, which includes a transmission unit (notification unit) 240 and a reception unit (acquisition unit) 242, performs wired communication or wireless communication with the monitoring station 4 via the network 10.

The transmission unit 240 transmits (notifies), for example, signals indicating the information stored in the storage unit 22 and the own station information held by the own station information holding unit 23 to the monitoring station 4. The reception unit 242 acquires information by receiving signals transmitted by the monitoring station 4. Further, the reception unit 242 outputs information which is received from the monitoring station 4 and which should be transmitted to the terminal station 6, to the wireless communication unit 20.

The control unit 25, which includes a setting unit 250, controls respective units which constitute the base station 2. For example, the setting unit 250 performs setting for operation of the base station 2 based on information acquired by the network communication unit 24 from the monitoring station 4, information acquired by the wireless communication unit 20 from the terminal station 6, or the like. Further, the setting unit 250 may perform setting for operation of the terminal station 6.

Figure 4:
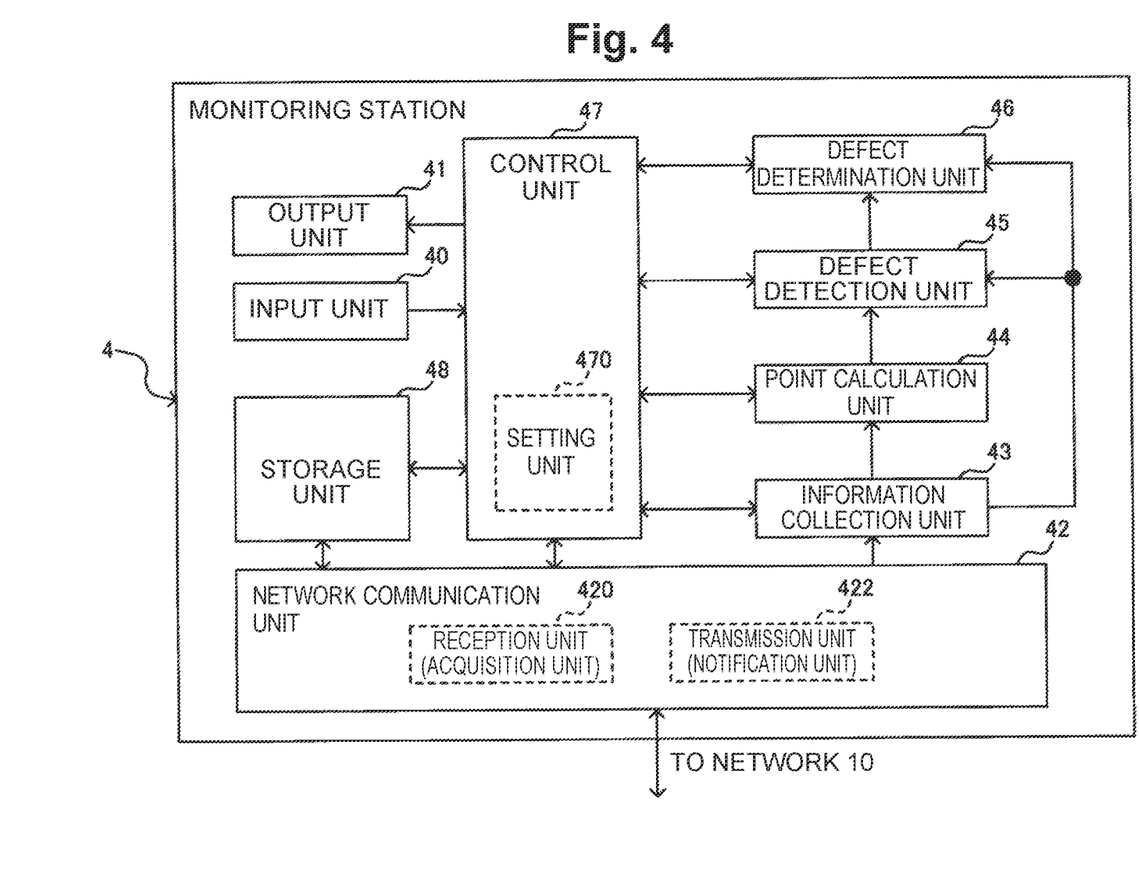
FIG. 4 is a functional block diagram illustrating an example of functions of a monitoring station according to one embodiment.

The monitoring station 4 will be described next. FIG. 4 is a functional block diagram illustrating an example of functions of the monitoring station 4 according to one embodiment. As illustrated in FIG. 4, the monitoring station 4 includes, for example, an input unit 40, an output unit 41, a network communication unit 42, an information collection unit 43, a point calculation unit 44, a defect detection unit 45, a defect determination unit 46, a control unit 47, and a storage unit 48.

The input unit 40 accepts input (such as instructions and settings) by a worker with respect to the monitoring station 4. The output unit 41 outputs results, or the like, of processing by the monitoring station 4 so as to show the results, or the like, to the worker.

The network communication unit 42, which includes a reception unit (acquisition unit) 420 and a transmission unit (notification unit) 422, performs wired communication or wireless communication with the base stations 2a-1 to 2a-4, 2b-1 to 2b-4 and 2c-1 to 2c-4 via the network 10.

The reception unit 420 receives information respectively transmitted by the base stations 2a-1 to 2a-4, 2b-1 to 2b-4 and 2c-1 to 2c-4 and outputs the received information to the information collection unit 43. The transmission unit 422 transmits information, or the like, processed by the monitoring station 4 to the base stations 2a-1 to 2a-4, 2b-1 to 2b-4 and 2c-1 to 2c-4.

The information collection unit 43 collects information received by the reception unit 420 and outputs the information to, for example, the point calculation unit 44, the defect detection unit 45 and the defect determination unit 46. For example, the information collection unit 43 collects wireless environment information such as an operation log including a plurality of information items indicating wireless environments around each base station 2 and each terminal station 6 from each of the base stations 2a-1 to 2a-4, 2b-1 to 2b-4 and 2c-1 to 2c-4 and outputs the collected results to the point calculation unit 44, the defect detection unit 45 and the defect determination unit 46.

Figure 6:
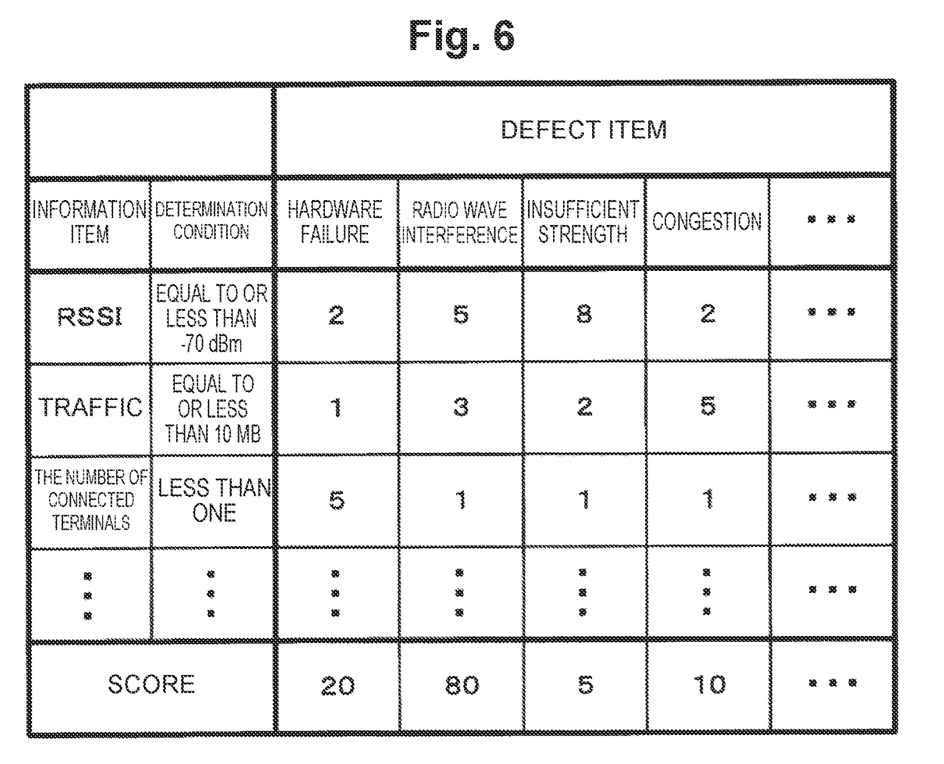
FIG. 6 illustrates an example of results obtained by a point calculation unit calculating a total point for each defect item.

The information items included in the wireless environment information include, for example, strength of a received signal strength indicator (RSSI), traffic, the number of terminal stations 6 connected to the base station 2 (the number of connected terminals), channel utilization, a data rate, a channel transition log, or the like (see FIG. 6).

Further, the information collection unit 43 may perform predetermined processing such as selection of a maximum value and counting of the number of detections on the collected wireless environment information and may output the wireless environment information subjected to the predetermined processing to the point calculation unit 44, the defect detection unit 45 and the defect determination unit 46.

Figure 5:
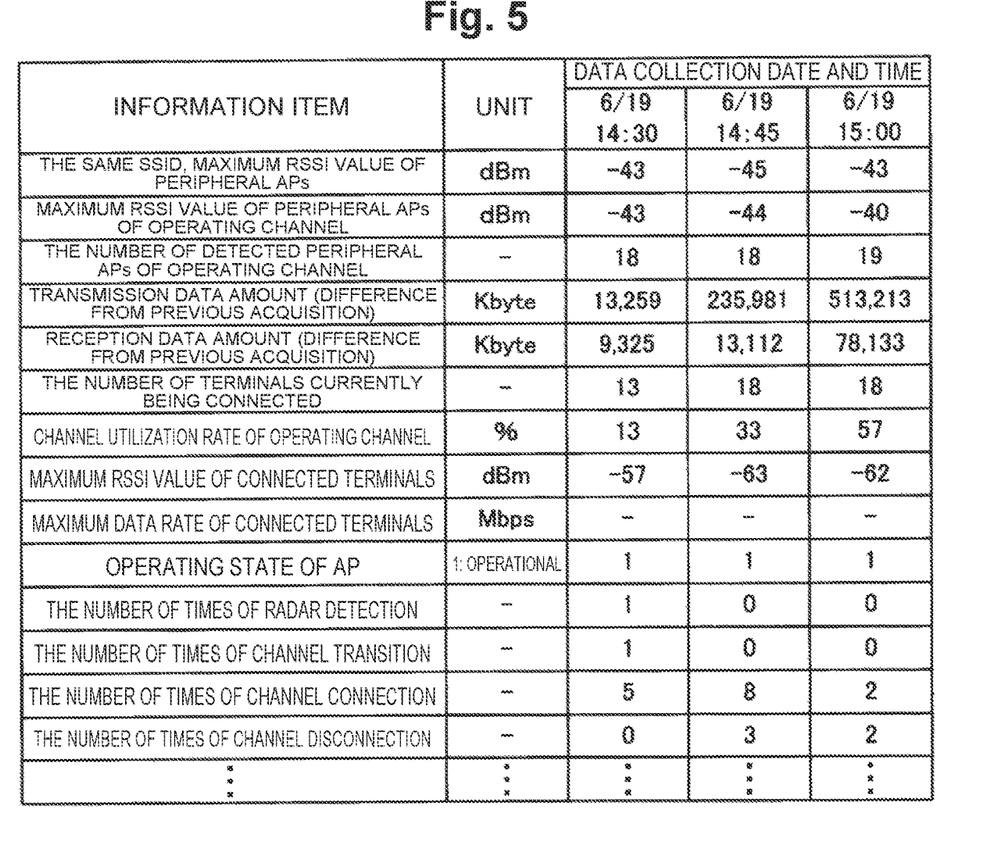
FIG. 5 illustrates an example of wireless environment information to be output after an information collection unit performs predetermined processing.

FIG. 5 illustrates an example of wireless environment information which is output to the point calculation unit 44, the defect detection unit 45 and the defect determination unit 46 after the information collection unit 43 performs the predetermined processing. It is assumed here that the information collection unit 43 outputs at least one of the collected wireless environment information and the wireless environment information subjected to the predetermined processing.

The point calculation unit 44 calculates a total point (score) of points to be provided to each of a plurality of defect items determined in advance in a case where a determination condition determined in advance for each information item is satisfied and outputs a calculation result to the defect detection unit 45. The defect items include, for example, a hardware failure, radio wave interference, insufficient strength, congestion, or the like.

FIG. 6 illustrates results obtained by the point calculation unit 44 calculating a total point for each defect item. For example, the point calculation unit determines whether or not a determination condition is satisfied for each information item, and in a case where the determination condition is satisfied, provides a point weighted for each defect item to each information item. The point calculation unit 44 then performs calculation of adding up the points respectively provided to the information items, for each defect item.

Specifically, in a case where radio wave interference is set as the defect item, the point calculation unit 44 adds five points in a case where the RSSI is equal to or less than −70 dBm, does not add three points in a case where traffic is greater than 10 MB, adds one point in a case where the number of connected terminals is smaller than one, and sets a total point as 80 by also adding points of other information items.

Further, in a case where at least one of an environment where the base station 2 is provided and a defect item is different, the point calculation unit 44 may determine whether or not a determination condition is satisfied using different thresholds (determination thresholds) and may calculate a total point of points respectively provided to the information items.

The defect detection unit 45 (FIG. 4) detects whether or not a defect listed as one or more of the defect items occurs based on the total point calculated by the point calculation unit 44 and outputs a detection result to the defect determination unit 46. For example, the defect detection unit 45 compares the score with a threshold set in advance and detects whether or not a defect listed as the defect items occurs.

As a specific example, in a case where a threshold for determining whether or not a defect regarding radio wave interference occurs is 70, the defect detection unit 45 detects that a defect regarding radio wave interference occurs if the score is 80 as in the result illustrated in FIG. 6.

Further, in a case where a threshold (detection threshold) for determining whether or not a defect regarding a hardware failure occurs is 80, the defect detection unit 45 detects that a defect regarding a hardware failure does not occur if the score is 20 as in the result illustrated in FIG. 6.

Further, the defect detection unit 45 may apply different weights to points or may set different thresholds, or the like, for determining whether or not a defect occurs in accordance with a difference in environments where the base stations 2a-1 to 2a-4, 2b-1 to 2b-4 and 2c-1 to 2c-4 are provided.

In other words, in a case where there is a difference in at least one of environments where the base stations 2 are provided and the defect items, the defect detection unit 45 may detect whether or not a defect listed as the defect items occurs using different detection thresholds.

For example, a threshold for determining whether or not a defect regarding a hardware failure of the base stations 2c-1 to 2c-4 provided outdoors occurs may be set lower than a threshold for determining whether or not a defect regarding a hardware failure of the base stations 2a-1 to 2a-4 and 2b-1 to 2b-4 provided indoors occurs.

Further, the defect detection unit 45 may detect whether or not one or more defects occur based on a combination of information items included in the wireless environment information collected by the information collection unit 43 without using the score calculated by the point calculation unit 44.

In this case, the defect detection unit 45 may detect whether or not one or more defects occur by performing machine learning of making a classification into a defect class or a non-defect class for each of the defect items indicating details of defects based on a combination of information items.

More specifically, the defect detection unit 45 may detect whether or not a defect occurs through classification into a defect class or a non-defect class through, for example, support vector machine (SVM) in which a multidimensional decision boundary (model) is learned based on a combination of information items for each defect item. In this event, the defect detection unit 45 may perform different machine learning for each of at least one of an environment where the base station 2 is provided and a defect item.

In this manner, the monitoring station 4 can detect whether or not a plurality of defects listed as a plurality of defect items occur through parallel processing based on a plurality of information items.

The defect determination unit 46 determines an estimated occurrence probability of the defect detected by the defect detection unit 45 based on a combination of information items. For example, the defect determination unit 46 determines an estimated occurrence probability of the defect for each of the defects detected by the defect detection unit 45 by performing machine learning for each defect item based on a combination of information items.

More specifically, the defect determination unit 46 may be constituted as a neural network (NN) including an input layer to which values of a plurality of information items are respectively provided for each defect item and an output layer which outputs a defect probability and a non-defect probability and may determine an estimated occurrence probability of a defect for each defect item.

Figure 7:
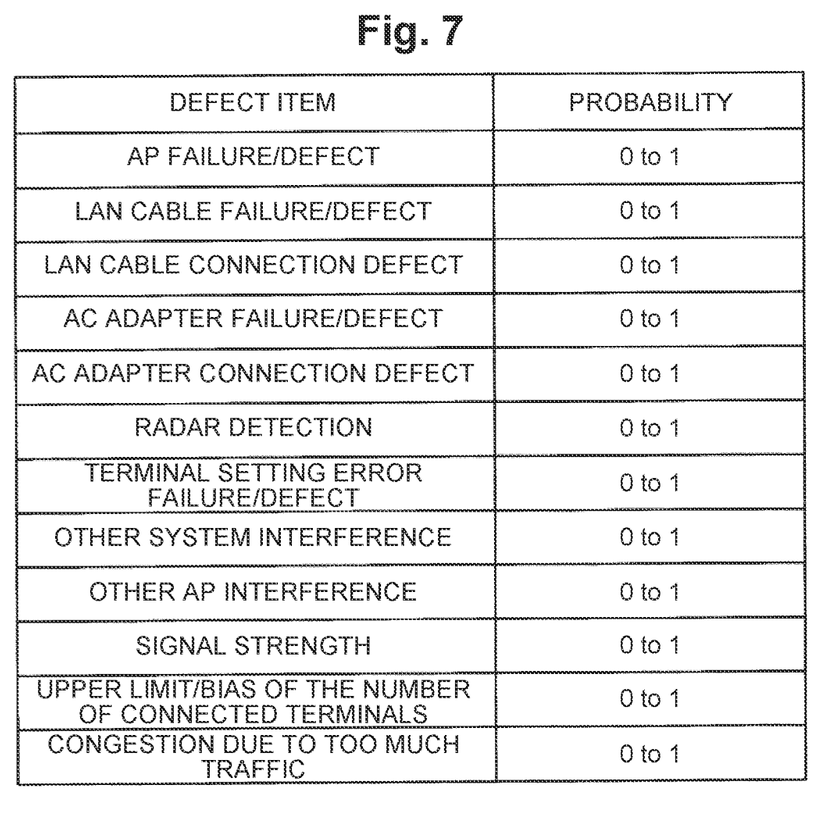
FIG. 7 illustrates an example of results obtained by a defect determination unit determining an estimated occurrence probability of a defect for each defect item.

FIG. 7 illustrates an example of results obtained by the defect determination unit 46 determining an estimated occurrence probability of a defect for each defect item. As illustrated in FIG. 7, the defect determination unit 46 respectively determines the estimated occurrence probabilities of the defects in parallel for the plurality of defect items.

Further, the defect determination unit 46 may perform machine learning for each of at least one of an environment where the base station 2 is provided and a defect item.

Note that the defect determination unit 46 may determine a probability indicating a likelihood of occurrence of a defect based on a ratio of the score with respect to a threshold to be used by the defect detection unit 45 to determine whether or not a defect occurs.

The control unit 47, which includes a setting unit 470, controls respective units which constitute the monitoring station 4. Further, the control unit 47 causes results obtained by respective units which constitute the monitoring station 4 processing information, to be stored in the storage unit 48. For example, the control unit 47 outputs the information collected by the information collection unit 43, the points and the total point calculated by the point calculation unit 44, whether or not a defect occurs detected by the defect detection unit 45, the estimated occurrence probability of the defect determined by the defect determination unit 46, or the like, to the output unit 41 and the storage unit 48.

The setting unit 470 performs setting for the respective units which constitute the monitoring station 4. For example, the setting unit 470 performs setting for the information collection unit 43, the point calculation unit 44, the defect detection unit 45 and the defect determination unit 46 based on settings input by the worker via the input unit 40.

The storage unit 48 outputs the stored information to the output unit 41 and the network communication unit 42 in accordance with control by the control unit 47. In other words, the output unit 41 can output the defect items detected by the defect detection unit 45 and the probability determined by the defect determination unit 46. Further, the network communication unit 42 can transmit the information stored in the storage unit 48 to the base stations 2a-1 to 2a-4, 2b-1 to 2b-4 and 2c-1 to 2c-4.

Note that the control unit 47 may specify a solution method for each defect item detected by the defect detection unit 45 and may cause the output unit 41 to output the specified solution method. For example, in a case where the defect detection unit 45 detects that a defect regarding radio wave interference occurs in the wireless communication system 1, the control unit 47 specifies a solution method for avoiding radio wave interference. For example, the control unit 47 may specify a solution method for a defect based on a look-up table, or the like, in which defect items (defects) are associated with solution methods.

Note that the monitoring station 4 may be able to set a combination, addition and deletion of information items to be used by the point calculation unit 44 to calculate a score, change of the determination condition, or the like, based on settings input via the input unit 40. Further, the monitoring station 4 may be able to set addition and deletion of defect items (defects) to be detected by the defect detection unit 45, weights of points, or the like, based on settings input via the input unit 40. Further, the monitoring station 4 may learn detection of a defect, and the control unit 47 may change the settings described above.

Figure 8:
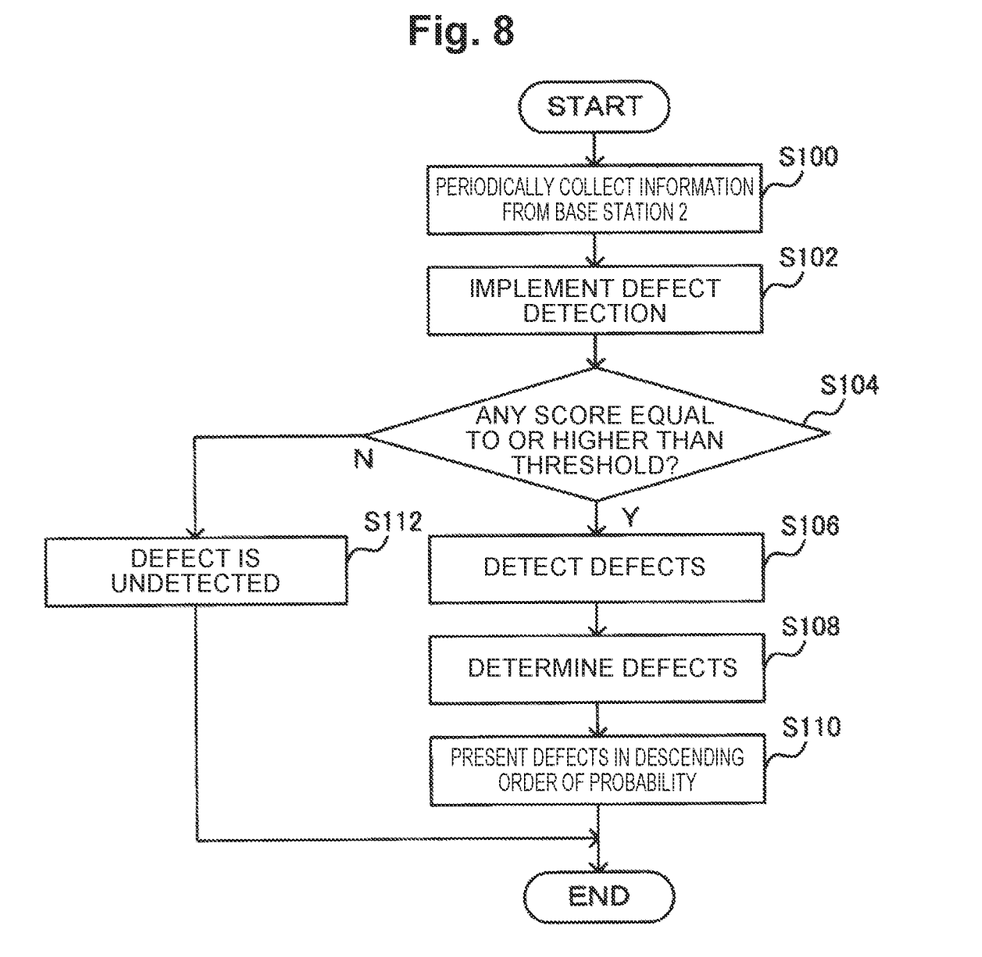
FIG. 8 is a flowchart illustrating outline of an operation example of the monitoring station according to one embodiment.

FIG. 8 is a flowchart illustrating outline of an operation example of the monitoring station 4. As illustrated in FIG. 8, the monitoring station 4 periodically collects information from each base station 2 (S100). The monitoring station 4 then detects a defect for each defect item (S102).

The monitoring station 4 determines whether or not there is a score equal to or greater than a threshold for determining whether or not a defect occurs at the defect detection unit 45 (S104), and in a case where there is a score equal to or greater than the threshold (S104: Yes), the processing proceeds to processing in S106, and in a case where there is no score equal to or greater than the threshold (S104: No), the processing proceeds to processing in S112.

At the monitoring station 4, the defect detection unit 45 detects that defects occur (S106), the defect determination unit 46 determines estimated occurrence probabilities of the defects (S108), and the output unit 41 presents the defects to the worker in descending order of the probabilities (S110).

In the processing in S112, the monitoring station 4 determines that a defect is undetected.

In this manner, in the wireless communication system 1, the monitoring station 4 collects wireless environment information including a plurality of information items indicating wireless environments and detects whether or not one or more defects occur based on a combination of information items, so that it is possible to efficiently detect whether or not a defect occurs.

Further, in a case where the defect detection unit 45 detects whether or not a defect occurs by performing machine learning, and the defect determination unit 46 determines a probability of occurrence of the defect by performing machine learning in the wireless communication system 1, it is possible to improve efficiency of machine learning and accuracy of detection of a defect and determination of a probability, because the wireless environment information can include a number of pieces of data which do not contribute to detection of a defect and determination of a probability.

In other words, in the wireless communication system 1, by individually performing learning while separating detection of a defect from determination of a probability, it is possible to improve accuracy of detection of a defect and determination of a probability even with less data.

Further, the monitoring station 4 may calculate an accuracy rate of a solution method by comparing a detection result of a defect and a determination result of a probability with a detection result of a defect and a determination result of a probability after the solution method presented to the detected defect is applied and may autonomously perform setting for the information collection unit 43, the point calculation unit 44, the defect detection unit 45 and the defect determination unit 46 based on the accuracy rate.

Note that part or all of respective functions of the base station 2, the monitoring station 4 and the terminal station 6 may be constituted with hardware such as a programmable logic device (PIP) and a field programmable gate array (FPGA) or may be constituted as a program to be executed by a processor such as a CPU.

For example, the monitoring station 4 according to the present invention can be implemented using a computer and a program, and the program can be recorded in a storage medium or can be provided through a network.

Figure 9:
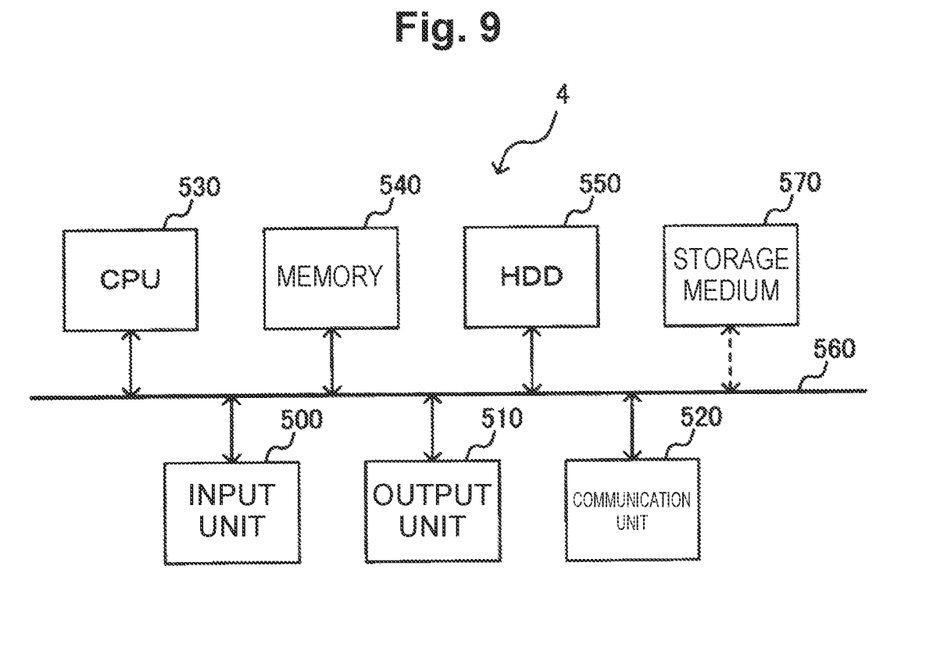
FIG. 9 illustrates a hardware configuration example of the monitoring station according to one embodiment.

FIG. 9 illustrates a hardware configuration example of the monitoring station 4 (the base station 2, the terminal station 6) according to one embodiment. As illustrated in FIG. 9, for example, the monitoring station 4 includes an input unit 500, an output unit 510, a communication unit 520, a CPU 530, a memory 540 and an HID 550 which are connected via a bus 560 and has functions as a computer. Further, the monitoring station 4 is constituted so as to be able to input/output data to/from a computer readable storage medium 570.

The input unit 500 is, for example, a keyboard, a mouse, or the like. The output unit 510 is, for example, a display device such as a display. The communication unit 520, which is, for example, a wired or wireless network interface, can perform a plurality of wireless communications.

The CPU 530 controls respective units which constitute the monitoring station 4 and performs the above-described calculation, or the like. The memory 540 and the HDD 550 constitute the above-described storage unit 48 which stores data. Particularly, the memory 540 stores respective pieces of data to be used in the above-described calculation. The storage medium 570 can store a wireless commination program, or the like, which causes functions of the monitoring station 4 to be executed. Note that an architecture which constitutes the monitoring station 4 (the base station 2, the terminal station 6) is not limited to the example illustrated in FIG. 9.

In other words, it is assumed here that the "computer" described here includes hardware such as an OS and peripheral equipment. Further, the "computer-readable storage medium" refers to a storage device such as a portable medium including a flexible disk, an magnetooptical disk, a ROM, a CD-ROM, or the like.

Further, the "computer-readable storage medium" may include a medium which dynamically holds a program in a short period of time such as a communication line in a case where a program is transmitted via a network such as the Internet or a communication line such as a phone line, and a medium which holds a program in a fixed period such as a volatile memory inside a computer which becomes a server or a client in that case.

While the embodiment of the present invention has been described above with reference to the drawings, the above-described embodiment is merely an example of the present invention, and it is obvious that the present invention is not limited to the above-described embodiment. Thus, components may be added, omitted, replaced or changed within a range not deviating from the technical idea and the scope of the present invention.

REFERENCE SIGNS LIST

1 Wireless communication system
2a-1 to 2a-4, 2b-1 to 2b-4, 2c-1 to 2c-4 Base station
4 Monitoring station
6 Terminal station
20 Wireless communication unit
21 Collection unit
22 Storage unit
23 Own station information holding unit
24 Network communication unit
25 Control unit
40 Input unit
41 Output unit
42 Network communication unit
43 Information collection unit
44 Point calculation unit
45 Defect detection unit
46 Defect determination unit
47 Control unit
48 Storage unit
60 Wireless communication unit
62 Collection unit
64 Storage unit 66 Control unit
200, 242, 420, 600 Reception unit (acquisition unit)
202, 240, 422, 602 Transmission unit (notification unit)
250, 470, 660 Setting unit
500 Input unit
510 Output unit
520 Communication unit
530 CPU
540 Memory
550 HDD
560 Bus
570 Storage medium

The invention claimed is:

1. A wireless communication system comprising:
a plurality of base stations to which one or more terminal stations are connectable; and
a monitoring station configured to monitor each of the plurality of base stations,
wherein the monitoring station comprises:
an information collection unit, implemented using one or more computing devices, configured to collect, from each of the plurality of base stations, wireless environment information including a plurality of information items indicating wireless environments around the plurality of base stations and the one or more terminal stations;
a defect detection unit, implemented using one or more computing devices, configured to detect whether or not one or more defects occur based on the plurality of information items; and
a defect determination unit, implemented using one or more computing devices, configured to determine one or more estimated occurrence probabilities of the one or more defects detected by the defect detection unit based on the plurality of information items,
wherein the defect detection unit is configured to detect whether or not the one or more defects occur by performing machine learning of making a classification into a defect class or a non-defect class for each defect item indicating details of a defect based on the plurality of information items, and
wherein the defect determination unit is configured to determine the one or more estimated occurrence probabilities of defects by performing machine learning on the respective one or more defects detected by the defect detection unit for each defect item based on the plurality of information items.

2. The wireless communication system according to claim 1,
wherein at least one of the defect detection unit or the defect determination unit is configured to perform machine learning for each of (i) at least one of the wireless environments where the plurality of base stations are provided and (ii) the defect items.

3. A monitoring station configured to monitor a plurality of base stations to which one or more terminal stations are connectable, the monitoring station comprising:
an information collection unit, implemented using one or more computing devices, configured to collect, from each of the plurality of base stations, wireless environment information including a plurality of information items indicating wireless environments around the plurality of base stations and the one or more terminal stations;
a defect detection unit, implemented using one or more computing devices, configured to detect whether or not one or more defects occur based on the plurality of information items; and
a defect determination unit, implemented using one or more computing devices, configured to determine one or more estimated occurrence probabilities of the one or more defects detected by the defect detection unit based on the plurality of information items,
wherein the defect detection unit is configured to detect whether or not the one or more defects occur by performing machine learning of making a classification into a defect class or a non-defect class for each defect item indicating details of a defect based on the plurality of information items, and
wherein the defect determination unit is configured to determine the one or more estimated occurrence probabilities of defects by performing machine learning on the respective one or more defects detected by the defect detection unit for each defect item based on the plurality of information items.

4. A defect detection method for a wireless communication system comprising a plurality of base stations to which one or more terminal stations are connectable, the defect detection method comprising:
collecting, from each of the plurality of base stations, wireless environment information including a plurality of information items indicating wireless environments around the plurality of base stations and the one or more terminal stations;
detecting whether or not one or more defects occur based on the plurality of information items; and
determining one or more estimated occurrence probabilities of the detected one or more defects based on the plurality of information items,
wherein detecting whether or not one or more defects occur comprises detecting whether or not the one or more defects occur by performing machine learning of making a classification into a defect class or a non-defect class for each defect item indicating details of a defect based on the plurality of information items, and
wherein determining one or more estimated occurrence probabilities comprises determining the one or more estimated occurrence probabilities of defects by performing machine learning on the respective detected one or more defects for each defect item based on the plurality of information items.

5. The monitoring station according to claim 3,
wherein at least one of the defect detection unit or the defect determination unit is configured to perform machine learning for each of (i) at least one of the wireless environments where the plurality of base stations are provided and (ii) the defect items.

6. The defect detection method according to claim 4,
machine learning is performed for each of (i) at least one of the wireless environments where the plurality of base stations are provided and (ii) the defect items.

* * * * *